United States Patent
Wang et al.

(10) Patent No.: US 10,048,801 B2
(45) Date of Patent: Aug. 14, 2018

(54) ADAPTIVE MECHANICAL CHANGE COMPENSATION FOR FORCE DETECTOR

(71) Applicant: SYNAPTICS INCORPORATED, San Jose, CA (US)

(72) Inventors: Ying Wang, Fremont, CA (US); Adam L. Schwartz, Redwood City, CA (US); Shubha Ramakrishnan, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 133 days.

(21) Appl. No.: 15/057,005

(22) Filed: Feb. 29, 2016

(65) Prior Publication Data
US 2017/0249049 A1 Aug. 31, 2017

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04105* (2013.01); *G06F 2203/04107* (2013.01)

(58) Field of Classification Search
CPC ....... G06F 3/0418; G06F 3/0414; G06F 3/044
See application file for complete search history.

(56) References Cited

U.S. PATENT DOCUMENTS

| | | |
|---|---|---|
| 7,158,122 B2 | 1/2007 | Roberts |
| 7,681,432 B2 | 3/2010 | Hay et al. |
| 7,784,366 B2 | 8/2010 | Daverman et al. |
| 8,768,560 B2 | 7/2014 | Willis |
| 9,024,907 B2 | 5/2015 | Bolender |
| 9,057,653 B2 | 6/2015 | Schediwy et al. |
| 2002/0158637 A1 | 10/2002 | Warmack et al. |
| 2007/0229464 A1 | 10/2007 | Hotelling et al. |
| 2009/0273573 A1 * | 11/2009 | Hotelling .............. G06F 3/0362 345/173 |
| 2012/0319987 A1 | 12/2012 | Woo |
| 2012/0327025 A1 | 12/2012 | Huska et al. |
| 2013/0073142 A1 | 3/2013 | Hergesheimer et al. |
| 2013/0106794 A1 | 5/2013 | Logan et al. |
| 2014/0085213 A1 | 3/2014 | Huppi et al. |
| 2014/0345358 A1 | 11/2014 | White et al. |
| 2016/0041648 A1 * | 2/2016 | Richards ................. G01L 25/00 345/174 |
| 2016/0139717 A1 * | 5/2016 | Filiz .......................... G01L 1/18 345/173 |

\* cited by examiner

*Primary Examiner* — Ibrahim A Khan
(74) *Attorney, Agent, or Firm* — Paradice and Li LLP (57) ABSTRACT

A capacitive sensing device is configured to detect force being applied to an input surface of the device by an input object, in addition to the position of the input object using touch sensing methods. Embodiments generate a compensation factor that is used to determine the force information in order to compensate for physical changes to the capacitive sensing device over time, air-gap non-uniform distribution, and other mechanical variations and changes.

20 Claims, 6 Drawing Sheets

ADAPTIVE MECHANICAL CHANGE COMPENSATION FOR FORCE DETECTOR

BACKGROUND

Field of the Disclosure

Embodiments of disclosure generally relate to capacitive sensing and, more particularly, sensing force on an input surface using capacitive sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments of the present disclosure provide a method of operating a capacitive sensing device having a plurality of sensor electrodes and at least one force electrode. At least a portion of the plurality of sensor electrode are configured to deflect towards the at least one force electrode. The method includes storing a baseline capacitance of the force electrode without a force applied to an input surface of the capacitive sensing device, and determining a change in capacitance of the force electrode caused by an input object contacting the input surface and based on a current capacitance of the force electrode and the stored baseline capacitance. The method further includes determining a mechanical change compensation factor associated with the capacitive sensing device based on a pre-determined calibration force, a change in capacitance of the force electrode in response to the pre-determined calibration force applied to the input surface, and a calibration baseline capacitance. The method includes determining force information for the input object contacting the input surface based on at least the mechanical change compensation factor, the baseline capacitance, and the change in capacitance.

Another embodiment of the present disclosure provides a processing system for a capacitive sensing device, as well as a capacitive sensing device having a processing system, both having a sensor module including sensor circuitry configured to perform the described method. The capacitive sensing device includes an input surface, at least one force electrode and a plurality of sensor electrodes. At least a portion of the plurality of the plurality of sensor electrode configured to deflect towards the at least one force electrode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Figure 1:
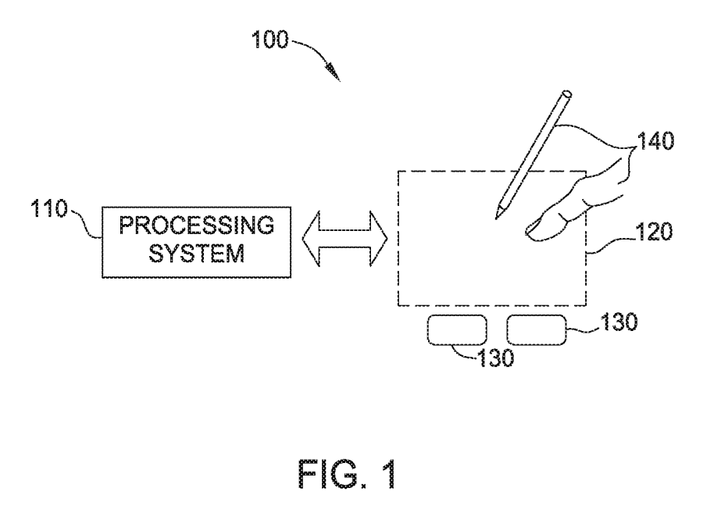
FIG. 1 is a block diagram of an exemplary input device, according to one embodiment described herein.

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
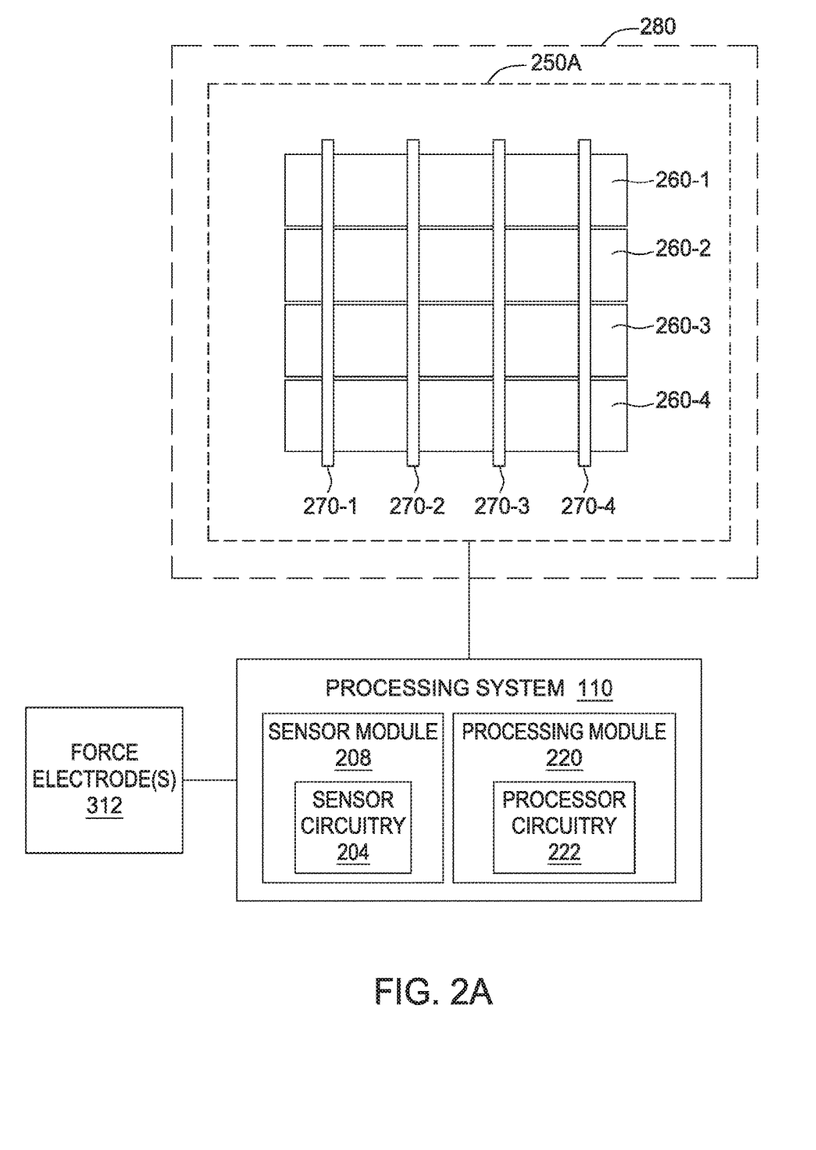
FIGS. 2A-2B illustrate portions of exemplary patterns of sensing elements according to embodiments described herein.

FIG. 2A illustrates a portion of an exemplary pattern of sensing elements according to some embodiments. For clarity of illustration and description, FIG. 2A shows the sensing elements in a pattern of simple rectangles and does not show various components, such as various interconnects between the sensing elements and the processing system 110. An electrode pattern 250A comprises a first plurality of sensor electrodes 260 (260-1, 260-2, 260-3, . . . 260-*n*), and a second plurality of sensor electrodes 270 (270-1, 270-2, 270-3, . . . 270-*m*) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250A can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a sensor module 208 having sensor circuitry 204. The sensor module 208 operates the electrode pattern 250A receive resulting signals from electrodes in the electrode pattern using a capacitive sensing signal having a sensing frequency. The processing system 110 can include a processing module 220 configured to determine capacitive measurements from the resulting signals. The processing module 220 can include processor circuitry 222, such as a digital signal processor (DSP), microprocessor, or the like. The processing module 220 can include software and/or firmware configured for execute by the processor circuitry 222 to implement the functions described herein. Alternatively, some or all of the functions of the processor module 220 can be implemented entirely in hardware (e.g., using integrated circuitry). The processing module 220 can track changes in capacitive measurements to detect input object(s) in the sensing region 120. The processing system 110 can include other modular configurations, and the functions performed by the sensor module 208 and the processing module 220 can, in general, be performed by one or more modules or circuits in the processing system 110. The processing system 110 can include other modules and circuits, and can perform other functions as described in some embodiments below.

The processing system 110 can operate in absolute capacitive sensing mode or transcapacitive sensing mode. In absolute capacitive sensing mode, receiver(s) in the sensor circuitry 204 measure voltage, current, or charge on sensor electrode(s) in the electrode pattern 250A while the sensor electrode(s) are modulated with absolute capacitive sensing signals to generate the resulting signals. The processing module 220 generates absolute capacitive measurements from the resulting signals. The processing module 220 can track changes in absolute capacitive measurements to detect input object(s) in the sensing region 120.

In transcapacitive sensing mode, transmitter(s) in the sensor circuitry 204 drive one or more of the first plurality of electrodes 260 with the capacitive sensing signal (also referred to as a transmitter signal or modulated signal in the transcapacitive sensing mode). Receiver(s) in the sensor circuitry 204 measure voltage, current, or charge on one or more of the second plurality of electrodes 270 to generate the resulting signals. The resulting signals comprise the effects of the capacitive sensing signal and input object(s) in the sensing region 120. The processing module 220 generates transcapacitive measurements from the resulting signals. The processing module 220 can track changes in transcapacitive measurements to detect input object(s) in the sensing region 120.

In some embodiments, the processing system 110 "scans" the electrode pattern 250A to determine capacitive measurements. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receiving resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The processing module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the sensor module 208, the processing module 220, and any other module(s) and/or circuit(s). In another embodiment, the processing system 110 can include a plurality of integrated circuits, where the sensor module 208, the processing module 220, and any other module(s) and/or circuit(s) can be divided among the integrated circuits. For example, the sensor module 208 can be on one integrated circuit, and the processing module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a display driver module and/or a display driver module.

Figure 2B:
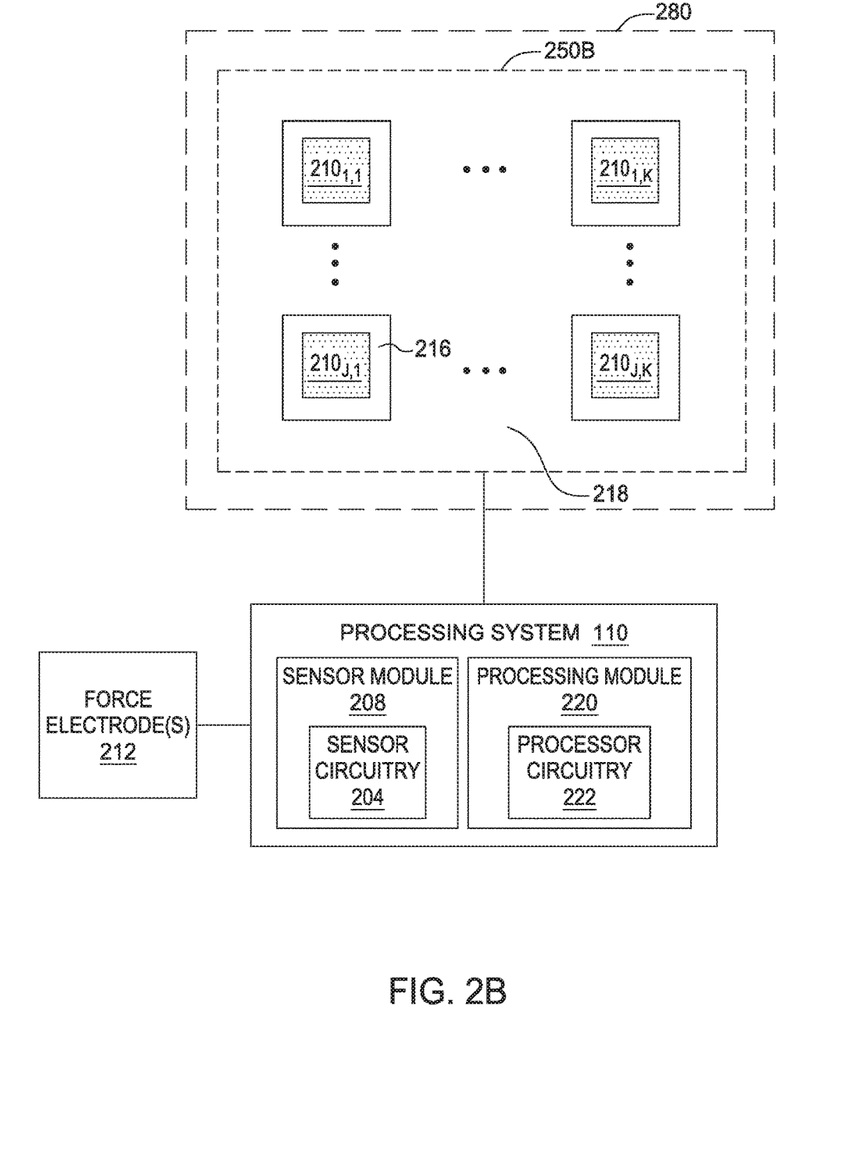

FIG. 2B illustrates a portion of another exemplary pattern of sensing elements according to some embodiments. For clarity of illustration and description, FIG. 2B presents the sensing elements in a matrix of rectangles and does not show various components, such as various interconnects between the processing system 110 and the sensing elements. An electrode pattern 250B comprises a plurality of sensor electrodes 210 disposed in a rectangular matrix. The electrode pattern 250B comprises sensor electrodes $210_{J,K}$ (referred to collectively as sensor electrodes 210) arranged in J rows and K columns, where J and K are positive integers, although one or J and K may be zero. It is contemplated that the electrode pattern 250B may comprise other patterns of the sensor electrodes 210, such as polar arrays, repeating patterns, non-repeating patterns, non-uniform arrays a single row or column, or other suitable arrangement. Further, the sensor electrodes 210 may be any shape, such as circular, rectangular, diamond, star, square, nonconvex, convex, non-concave concave, etc. Further, the sensor electrodes 210 may be sub-divided into a plurality of distinct sub-electrodes. The electrode pattern 250 is coupled to the processing system 110.

The sensor electrodes 210 are typically ohmically isolated from one another. Additionally, where a sensor electrode 210 includes multiple sub-electrodes, the sub-electrodes may be ohmically isolated from each other. Furthermore, in one embodiment, the sensor electrodes 210 may be ohmically isolated from a grid electrode 218 that is between the sensor electrodes 210. In one example, the grid electrode 218 may surround one or more of the sensor electrodes 210, which are disposed in windows 216 of the grid electrode 218. In some embodiments, the electrode pattern 250B can include more than one grid electrode 218. In some embodiments, the grid electrode 218 can have one or more segments. The grid electrode 218 may be used as a shield or to carry a guarding signal for use when performing capacitive sensing with the sensor electrodes 210. Alternatively or additionally, the grid electrode 218 may be used as sensor electrode when performing capacitive sensing. Furthermore, the grid electrode 218 may be co-planar with the sensor electrodes 210, but this is not a requirement. For instance, the grid electrode 218 may be located on a different substrate or on a different side of the same substrate as the sensor electrodes 210. The grid electrode 218 is optional and in some embodiments, the grid electrode 218 is not present.

In a first mode of operation, the processing system 110 can use at least one sensor electrode 210 to detect the presence of an input object via absolute capacitive sensing. The sensor module 208 can measure voltage, charge, or current on sensor electrode(s) 210 to obtain resulting signals indicative of a capacitance between the sensor electrode(s) 210 and an input object. The processing module 220 uses the resulting signals to determine absolute capacitive measurements. When the electrode pattern 250B, the absolute capacitive measurements can be used to form capacitive images.

In a second mode of operation, the processing system 110 can use groups of the sensor electrodes 210 to detect presence of an input object via transcapacitive sensing. The sensor module 208 can drive at least one of the sensor electrodes 210 with a transmitter signal, and can receive a resulting signal from at least one other of the sensor electrodes 210. The processing module 220 uses the resulting signals to determine transcapacitive measurements and form capacitive images.

The input device 100 may be configured to operate in any one of the modes described above. The input device 100 may also be configured to switch between any two or more of the modes described above. The processing system 110 can be configured as described above with respect to FIG. 2A.

In some embodiments, the processing system 110 is further configured to determine force information for an input object. As shown in FIGS. 2A-2B, the processing system 110 can be further coupled to one or more force electrodes 212. The processing system 110 can determine the force information in response to capacitive measurements obtained using sensor electrodes of the input device 100, one or more force electrode(s) 212, or a combination of both. For example, transcapacitive measurements can be obtained between the sensor electrodes integrated within a display device of the input device 100 and/or a dedicated force receiver electrode. In another example embodiment, self-capacitive measurements can be obtained using the sensor electrodes and/or the force electrode 212. As described further below, the sensor electrodes of the input device 100 can bend in response to a force applied by an input object. The bending results in a deflection from equilibrium of at least a portion of the sensor electrodes integrated within the display device. The deflection of sensor electrode(s) due to the applied force changes the distance between at least one of the sensor electrodes and the one or more force receiver electrodes, which can be detected as a change in transcapacitance. The force information can include a "force image", "force profile", or a scalar force value, depending on the configuration of the sensor electrodes and the force electrodes 212. The force information can be combined with position information to determine both position of an input object and a force applied by the input object.

Figure 3:
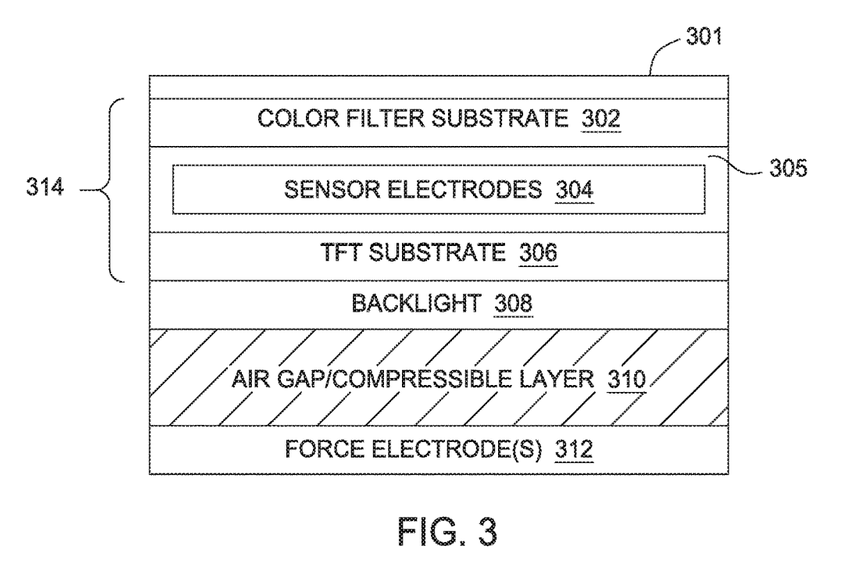
FIG. 3 is a block diagram depicting a cross-section of an input device according to an embodiment.

FIG. 3 is a block diagram depicting a cross-section 300 of the input device 100 according to an embodiment. The input device 100 includes an input surface 301, a display cell 314, a backlight 308, an air gap/compressible layer 310, and at least one force electrode 312. The input surface 301 can include a transparent substrate, such as a glass substrate. The force electrode(s) 312 can be metal electrode(s). In some embodiments, the force electrode 312 can be a conductive, structural element of the input device 100 which is re-used (e.g., as a ground) for influencing capacitive measurements to obtain force information. In other embodiments, the force electrode 312 is a dedicate force receiver electrode configured for capturing transcapacitive measurements to obtain force information.

In an embodiment, the display cell 314 includes a color filter substrate 302, inner layers 305, and a thin-film transistor (TFT) substrate 306. The inner layers 305 can include various layers, such as a color filter layer, liquid crystal display (LCD) material layer, conductive layers, dielectric layers, and the like. In particular, the inner layers 305 include one or more conductive layers forming sensor electrodes 304. The color filter substrate 302, the inner layers 305, and the TFT substrate 306 are flexible such that the display cell 314 is flexible.

The sensor electrodes 304 can have various configurations. In one example, the sensor electrodes 304 can include the plurality of sensor electrodes 260 in the sensor electrode pattern 250A. In another example, the sensor electrodes 304 can include the sensor electrodes 210 in the sensor electrode pattern 250B. In any configuration, each of the sensor electrodes 304 comprises at least one common electrode configured for display updating and capacitive sensing.

The display cell 314 is disposed between the input surface 301 and the backlight 308. The display cell 314 is flexible and can flex or bend when force is applied to the input surface 301. In the present example, the force electrode(s) 312 are separated from the backlight 308 by the air gap/compressible layer 310, which can either be an air gap or a layer of compressible material. In other embodiments, the backlight 308 and the air gap/compressible layer 310 may be an integrated layer of insulated light-guide material. Accordingly, according to some embodiments, the sensor electrodes 304 are disposed between the input surface 301 and the force electrode(s) 312. The sensor electrodes 304 are configured to deflect toward the force electrode(s) 312 as the display cell 314 bends into the air gap/compressible layer 310 in response to a force applied to the input surface 301. Depending on the location of the force applied to the input surface 301, at least a portion of the sensor electrodes 304 will deflect toward the force electrode(s) 312 in response to the applied force. While FIG. 3 illustrates one potential embodiment, it should be understood that various other configurations may operate under the principles described herein. For example, the sensor electrodes 304 need not be disposed between the input surface 301 and the force electrodes 312. Further, the force electrodes and sensor electrodes need not be completely distinct sets of electrodes. Some of the sensor electrodes may be used as force electrodes and vice versa. In some embodiments, the same electrodes may be used as both force electrodes and sensor electrodes in order to detect force and input object location in the sensing region, respectively. In some embodiments, for the purpose of force detection, the sensor electrodes may be permanently or temporarily grounded or held at a relatively constant voltage. That is, the force electrodes may deflect relative to an object having a relatively constant voltage to enable the processing system to detect applied force via the force electrodes.

Figure 4:
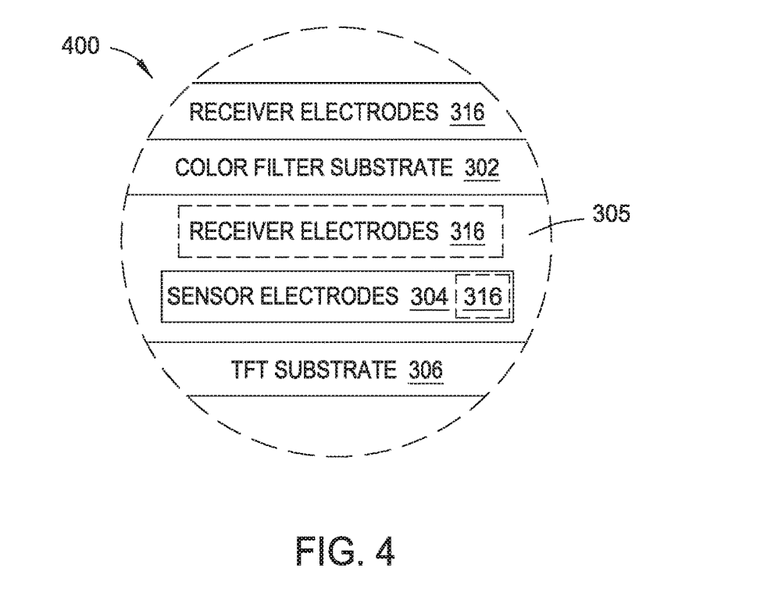
FIG. 4 is a block diagram depicting a cross-section of a display cell according to an embodiment.

FIG. 4 is a block diagram depicting a cross-section of an alternative embodiment of a display cell 400. The display cell 400 can be used in place of the display cell 314. In the display cell 400, receiver electrodes 316 are disposed on the color filter substrate 302. In an embodiment, the sensor electrodes 304 can include the plurality of sensor electrodes 260 operating as transmitter electrodes, and the receiver electrodes 316 can include the plurality of sensor electrodes 270, of the sensor electrode pattern 250A. In another embodiment, the receiver electrodes 316 are disposed within the inner layers 305, rather than on the color filter substrate 302. In yet another embodiment, the receiver electrodes 316 are disposed on the same layer as the sensor electrodes 304.

Figure 5:
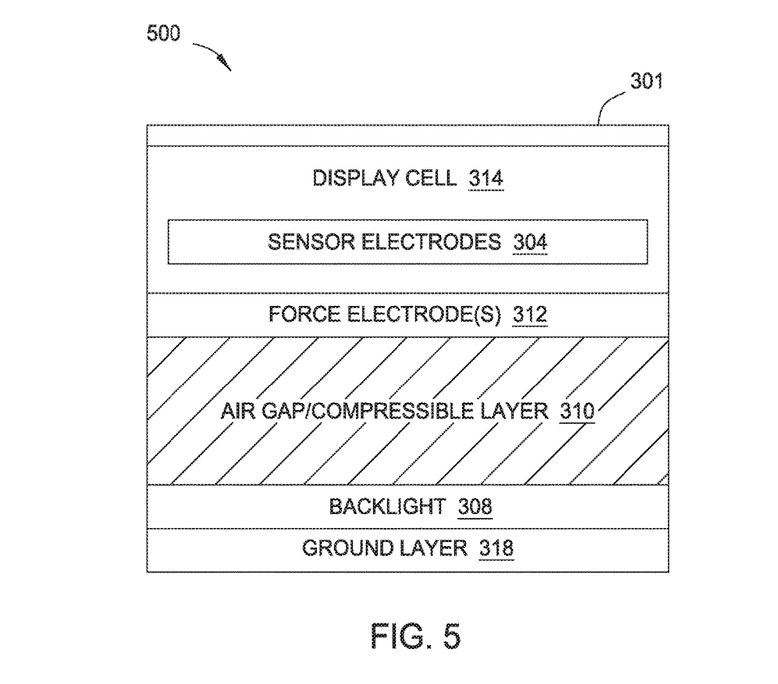
FIG. 5 is a block diagram depicting a cross-section of an input device according to another embodiment.

FIG. 5 is a block diagram depicting a cross-section 500 of the input device 100 according to another embodiment. In the present embodiment, the force electrode(s) 312 are disposed between the display cell 314 and the backlight 308 (i.e., "below" the display cell 314 and "above" the backlight 308). For example, the force electrode(s) 312 can be disposed below a TFT substrate 306 of the display cell 314. In some embodiments, the force electrode(s) 312 are separated from a ground layer 318, such as a mid-frame component of the input device or other conductive layer of the input device, by the air gap/compressible layer 310. In other embodiments, the force receiver electrode(s) 312 are separated from the display cell 314 by the air gap/compressible layer 310. The display cell 314 can comprise the display cell 314 of FIG. 3, the display cell 400, or the like.

Other types of flexible display cells can be used in the embodiments of FIGS. 3-5, such as an OLED display. In general, the display cell can include display pixels formed from LEDs, OLEDs, plasma cells, electronic ink elements, LCD components, or other suitable display pixel structures compatible with flexible displays. The sensor electrodes 304 are disposed within the display cell and are deflected toward the force electrode(s) 312 when force is applied that bends the flexible display.

Figure 6A:
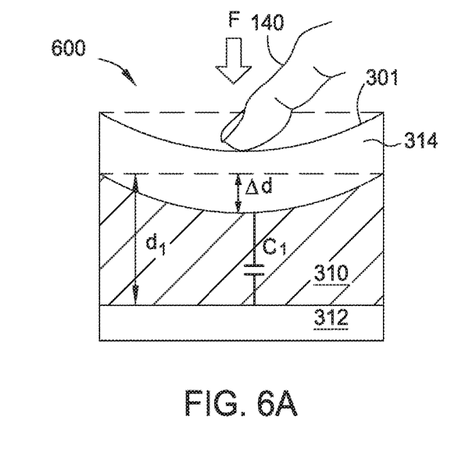
FIGS. 6A and 6B are block diagrams depicting cross-sections of an input device in various states while a force is applied to the input device by an input object, according to an embodiment.
Figure 6B:
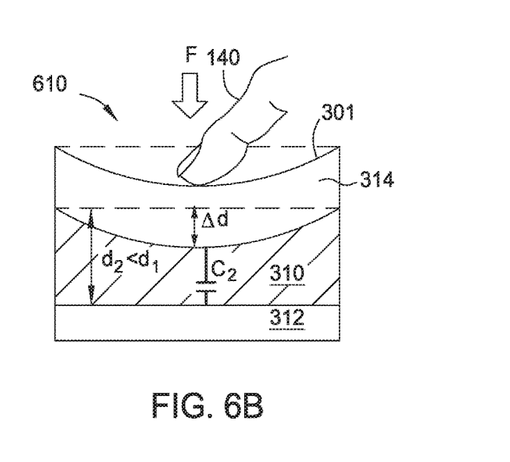

FIGS. 6A and 6B are block diagrams depicting cross-sections of an input device 100 in various states while a force is applied to the input device 100 by an input object 140, according to an embodiment. In a first state 600 shown in FIG. 6A, the sensor electrodes are disposed at a distance ($d_1$) from the force electrode(s) 312, which is at least the "thickness" of the air gap/compressible layer 310.

In operation, the input object 140 (e.g., a finger) applies a given force F to the input surface 301, which in turn causes the display cell 314 to bend into the air gap/compressible layer 310. A subset of the sensor electrodes 304 disposed within the display cell 314 deflect toward the force receiver electrode(s) 312. The deflection of sensor electrode(s) due to the applied force changes the distance (depicted as $\Delta d$) between at least one of the sensor electrodes and the one or more force receiver electrodes, and changes the capacitive coupling between sensor electrode(s) 304 and force receiver electrode(s) 312. This change in capacitive coupling can be used to determine the amount of applied force. In one formulation, the force information can be determined using the linear relationship between force and displacement (i.e., $F=k\Delta d$), where the displacement $\Delta d$ is determined based on the change in capacitance $\Delta C_1$, according to Equation 1 below.

$$\Delta C = \frac{A\varepsilon}{d - \Delta d} - \frac{A\varepsilon}{d} \quad (1)$$

However, reliance on the original dimensions of the air gap/compressible layer 310 (e.g., distance $d_1$ between the sensor electrodes 304 and the force electrode 312) to determine changes in capacitance and, in turn, force information has several mechanical challenges. In some cases, the dimensions of the air gap/compressible layer 310 can vary from device to device due to minute variations the manufacturing process. In other cases, the dimensions of the air gap/compressible layer 310 can change in a particular device due to mechanical stresses over the lifetime of the device.

For example, FIG. 6B depicts a second state 610 in which the input device 100 has undergone some mechanical change. As shown, the distance between the sensor electrodes and the force electrode(s) 312 has decreased to a distance $d_2$, where the distance $d_2$ is less than the distance $d_1$ in the first state 600. If the input object applies the same given force F to the input device 100, a subset of the sensor electrodes 304 again deflects towards the force electrode(s) 312 by the same displacement distance $\Delta d$ (recall the linear relationship $F=k\Delta d$). However, because of the smaller gap distance $d_2$, the same change in distance $\Delta d$ is detected as a much larger change in transcapacitance $\Delta C_2$, resulting in inaccurate force information.

In other cases, the dimensions of the air gap/compressible layer 310 can vary across a particular device, i.e., a non-uniform gap. That is, the force electrode(s) may have a non-parallel orientation (i.e., slanted) relative to the conductive layer on the other side of the air gap/compressible layer 310. For example, the air gap may be less in some locations and greater in other locations. Thus, mechanical differences and changes to the input device 100 present challenges in determining force information of an input object on an input surface.

Accordingly, embodiments of the present disclosure provide a method for determining force information using a mechanical change compensation factor that takes into account mechanical change of an input device. The described technique removes, or lessens, the dependency on the gap distance of the air gap/compressible layer from the determination of force information, because the gap distance can change over time and across difference devices.

In one embodiment, the described system for determining force information using a mechanical change compensation factor includes a calibration phase with respect to amount of force applied to the input surface. As described below, embodiments store the sensor response to a known force during calibration, and this information can be used to estimate the applied force during run-time. In other embodiments, the described system can undergo other calibration phases, such as with respect to the position of the force applied to the input surface. In a force position calibration, embodiments store the sensor response to a known force at different positions on the sensor; this information is used to correct non-uniformity of the sensor response with respect to the location of the applied input force.

Figure 7:
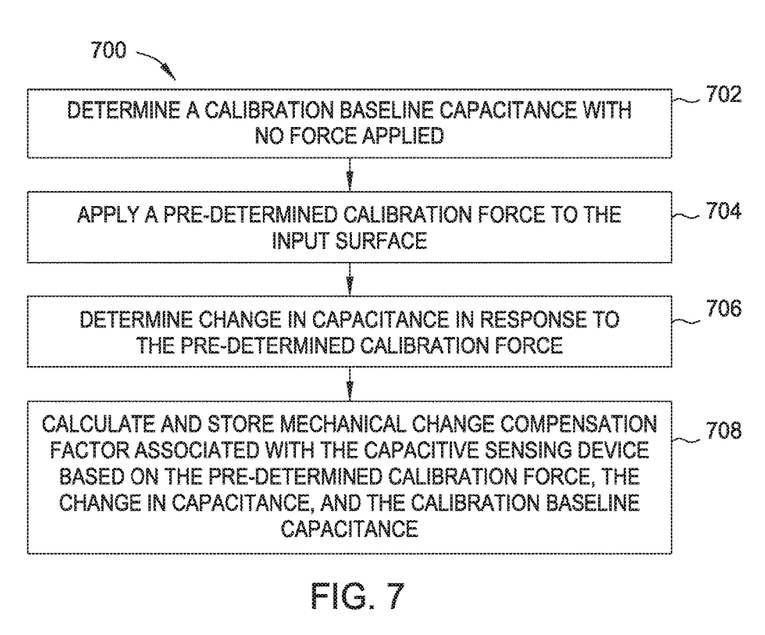
FIG. 7 is a flow diagram depicting a method of calibrating an integrated display device and capacitive sensing device according to an embodiment.

FIG. 7 is a flow diagram depicting a method 700 of calibrating an integrated display device and capacitive sensing device according to an embodiment. While method 700 is described for calibrating an input device 100 as being performed by the processing system 110 in the input device 100, it should be understood that in other embodiments the calibration phase for an input device 100 may be performed by other systems, such as a dedicated calibration system at the manufacturing facility.

The method 700 begins at step 702, where the processing system 110 determines a calibration baseline capacitance of the force electrode 312 with no force applied to an input surface of the input device 100. Though similar to the baseline images described earlier related to the absence of an input object within the sensing region 120, the calibration baseline capacitance are capacitive measurements obtained in association having no force applied to the input surface of the input device (e.g., by an input object 140). For simplicity of explanation, embodiments may be herein described as from the perspective of a single pixel or a single force electrode (i.e., a single electrode approach), although it is understood that the described method can be multiple force electrodes in different positions in the input device 100.

In some embodiments, the processing system 110 determines the calibration baseline capacitance of the force electrode 312 using absolute capacitance sensing methods based on the capacitive coupling between force electrodes 312 and a conductive layer within the input device (e.g., ground layer 318). In other embodiments, the processing system 110 determines the calibration baseline capacitance of the force electrode 312 utilize transcapacitance sensing methods based on changes in the capacitive coupling between the sensor electrodes 304 (acting as transmitter electrodes) and a force electrode 312 disposed across the air gap (acting as a receiver electrode). The processing system 110 may store the determined calibration baseline capacitance ($C_{bc}$) in a memory or storage device for later retrieval and use in further calculations.

At step 704, a pre-determined calibration force is applied to the input surface of the capacitive sensing device. In some embodiments, a calibration device configured to actuate and apply programmed amounts of force may act as an input object and contact the input surface 301 of the capacitive sensing device with a first calibration force. For example, the calibration device can apply a first calibration of force equal to 0.5 N. In some embodiments, the calibration force may be applied to a specified location on the input surface. Different calibration forces may be used in various embodiments, but the calibration force is pre-determined in the sense that it should remain stable after selection.

At step 706, the processing system 110 determines a change in capacitance ($\Delta C_c$) of the force electrode(s) in response to the pre-determined calibration force ($F_c$) applied to the input surface. In some embodiments, the processing system 110 determines a current capacitive measurement and calculates a difference from the calibration baseline capacitance (as determined in step 702).

At step 708, the processing system 110 calculates a mechanical change compensation factor associated with the capacitive sensing device based on the pre-determined calibration force, the change in capacitance, and the calibration baseline capacitance. The determined mechanical change compensation factor and other values (e.g., the calibration force $F_c$) may be stored in a storage or memory (e.g., ROM) of the input device for use in determining force information at runtime. In one formulation, the mechanical change compensator factor m may be calculated as the ratio of the change in capacitance $\Delta C_c$ to the sum of the calibration baseline capacitance $C_{bc}$ and the capacitance change $\Delta C_c$, divided by the calibration force $F_c$ as shown in Equation (2).

$$m = \frac{\Delta C_c}{F_c * (C_{bc} + \Delta C_c)} \quad (2)$$

In some embodiments, the calibration method 700 may be extended by measuring the sensor response for multiple forces applied to a single location to capture any non-linear effects caused by the material of the compressible layer 310 (e.g., by form in the air gap). For example, the processing system 110 may repeat steps 704 to 708, applying different forces at a fixed location of the input surface and obtaining the resulting sensor responses. Using the multiple measurements, the processing system 110 may fit a second-order polynomial to the measured sensor response curve and invert the mapping when reporting the force.

Figure 8:
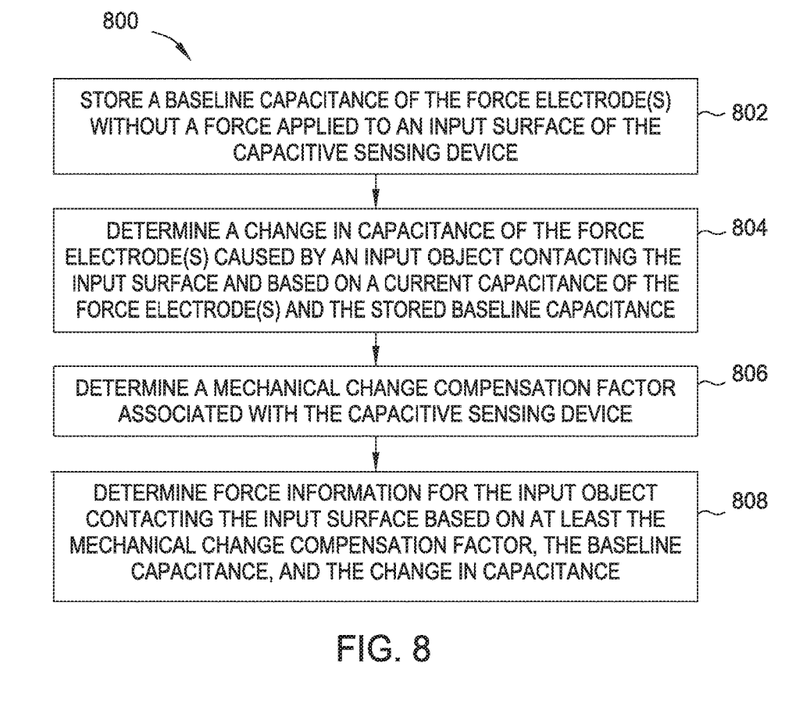
FIG. 8 is a flow diagram depicting a method of operating an integrated display device and capacitive sensing device according to an embodiment.

FIG. 8 is a flow diagram depicting a method 800 of operating an integrated display device and capacitive sensing device according to an embodiment. The method 800 can be performed by the processing system 110 described above to determine force information or both force information and position information for an input object interacting with the input device 100. In an embodiment, processing system 110 performs all or a portion of the method 800 during a non-display update time, such as a vertical blanking time or a horizontal blanking time. In another embodiment, the non-display update time can be a long horizontal blanking period that occurs between display line updates of a display frame and is at least as long as the display line update period. In some embodiments, one non-display update period can be used for force sensing and other non-display update period can be used for touch sensing, The method 800 begins at step 802, where the processing system 110 stores a (current) baseline capacitance of the force electrode in absence of any input object and applied force, i.e., without a force applied to an input surface of the capacitive sensing device. In some embodiments, the processing system 110 obtains a "raw" capacitance measurement of the force electrode(s) 312 using "self capacitance" (or "absolute capacitance") sensing methods based on the capacitive coupling between force electrodes 312 and a conductive layer on the other side of the air gap/compressible layer 310, as well as other capacitance couplings between the force electrode 312 with other electrical components within the input device 100. The raw capacitance measurement may include component capacitances, such as a display capacitance ($C_{LCD}$) between the force electrode 312 and a conductive ground layer in the display cell 314, or a capacitive coupling with internal integrated circuits of the input device (e.g., the processing system 110).

In other embodiments, the processing system 110 obtains a raw capacitance measurement of the force electrode(s) 312 using transcapacitive sensing methods based on the capacitive coupling between the force electrodes. For example, the processing system 110 may drive the sensor electrodes 304 with force sensing signals. The force sensing signals comprise modulated signals, which are capacitively coupled to the force electrode(s) 312, i.e., as receiver electrodes. For example, if the input device 100 includes the sensor electrode pattern 250A, the sensor circuitry 204 can drive the sensor electrodes 260 with force sensing signals. In another example, if the input device 100 includes the sensor electrode pattern 250B, the sensor circuitry 204 can drive the sensor electrodes 210 with force sensing signals. The processing system 110 then receives resulting signals from the force electrodes(s) 312. For example, the sensor circuitry 204 can measure voltage, current, or charge on the force receiver electrode(s) 312 to generate the resulting signals. The resulting signals comprise the effects of the force sensing signal and any deflection of the sensor electrodes 304 due to force applied to the input device 100. The processing system 110 can scan the force receiver electrodes 312 to receive the resulting signals in a manner similar to transcapacitive position sensing described above.

To obtain more accurate measurements, the processing system 110 may modifies the raw capacitance by removing the capacitances unrelated to the "air gap" capacitance between a force electrode 312 and a conductive layer on the other side of the air gap/compressible layer 310. The capacitance $C_{LCD}$ associated with a given input device can be pre-determined via production tests or by calculation by the processing system 110. The processing system 110 may remove or subtract the capacitance $C_{LCD}$ from the raw capacitance to obtain the baseline capacitance of the force electrode ($C_b$), as expressed in Equation (3).

$$C_b = C - C_{LCD} \quad (3)$$

At step 804, the processing system 110 determines a change in capacitance $\Delta C_i$ of the force electrode caused by an input object contacting the input surface and based on a current capacitance of the force electrode and the stored baseline capacitance (of step 802). In some embodiments, the processing system 110 detects changes in self-capacitance of force electrode(s) 312. As noted earlier, in some embodiments, the plurality of sensor electrodes are disposed between the input surface and the at least one force electrode. At least a portion of the plurality of sensor electrode are configured to deflect towards the at least one force electrode in response to a force applied to the input surface. The change in distance between the force electrode(s) 312 and some conductive layer of the capacitive sensing device results in a change in the absolute capacitive values. In other embodiments in which the processing system 110 detects changes in transcapacitance between sensor electrode(s), the change in distance between sensor electrode(s) 304 and the force electrode(s) 312 results in a change in the transcapacitive values.

The processing system 110 may update the mechanical change compensation factor during operations of the capacitive sensing device, i.e., after the calibration phase has been completed. In one embodiment, the processing system 110 acquires second changes of capacitance of the plurality of sensor electrodes and updating a set of parameters of the mechanical change compensation factor based on the second changes of capacitance.

At step 806, the processing system 110 determines a mechanical change compensation factor associated with the capacitive sensing device based on a pre-determined calibration force, a change in capacitance of the force electrode in response to the pre-determined calibration force applied to the input surface, and a calibration baseline capacitance. In some embodiments, the processing system 110 retrieves (e.g., from a memory or storage) a pre-determined mechanical change compensation factor associated with the capacitive sensing device that has been calculated based on a calibration force, a sensor response to the calibration force, and a calibration baseline capacitive measurement, such as the mechanical change compensation factor determined in the method 700. The mechanical change compensation factor provides information about the baseline gap distance at time of calibration which may be different from the baseline gap distance at time of determining force information, i.e., the baseline gap distance may have decreased with the age of the capacitive sensing device.

At step 808, the processing system 110 determines force information for the input object contacting the input surface based on the changes in capacitance and further based on the mechanical change compensation factor (m) and the baseline capacitance ($C_b$). In one formulation, the force information for the input object may be estimated as the ratio of change (i.e., deflection) produced at runtime over the change produced at calibration-time times the calibration force. The information regarding the sensor response at time of calibration may be, in effect, encoded within the compensation factor m. In one formulation derived by substituting Equations (1) and (2), the force information $f_i$ for a force electrode i may be estimated according to Equation (4), where $\Delta C_i$ is the change in current capacitance in response to some applied force (step 806), $C_b$ is a baseline capacitance (step 802), $C_{bc}$ is a calibration baseline capacitance (step 702), and m is the mechanical change compensation factor (step 806).

$$f_i = \frac{\Delta C_i}{(C_b + \Delta C_i)} * \frac{C_{bc}}{m * C_b} \tag{4}$$

In some embodiments, force information may be determined for each force electrode i in the capacitive sensing device, and a total force $F_e$ may be estimated as the sum of all force information associated with each force electrode, as represented in Equation (5).

$$F_e = \Sigma f_i \tag{5}$$

In one embodiment, a force image may be determined from based on the changes in transcapacitance and the "pixels" in the transcapacitive force image that exhibit the change in transcapacitance can be used to derive a position of the applied force. Thus, the force information can include information as to the magnitude of the applied force or both the magnitude and position of the applied force.

In some embodiments, the determined force information may be modified according to a proportionality factor (e.g., p(x,y)) which adjusts the force information according to the position of the input object, thereby compensating for non-uniformity of the sensor response with respect to location of the applied input. The proportionality factor can be represented by a lookup table determined at calibration time, for example, by modeling. For instance, a thin plate bending model or Euler-Bernoulli bending beam model can be used. Calibration can be used to fit the parameters of the model to the design and response of the capacitive sensing device. Such an approach provides a more compact representation of the function and also reduces the calibration burden, and enables the possibility of adaptively updating the model parameters during live usage.

The described technique for determining force information for a capacitive sensing device can be modified to utilize other similar formulations of the described calculations. For example, in another formulation of a single electrode approach, the force information $f_i$ detected by a force electrode i for an input object applying force to the input surface may be estimated according to Equation (6), where $\Delta C_i$ is the change in current capacitance in response to some applied force (step 806), $p_{ij}(x,y)$ is a proportionality factor that compensates the force applied at a position having the coordinates (x,y), $d_0$ is an initial gap distance between the force electrode 312 and the sensor electrodes 304, and k is a parallel plate constant associated with the capacitive sensing device. It is understood that the constants $d_0$ and k are associated with a particular force sensor design and nominal air gap, and may be determined at design time or calibration time.

$$f_i = \frac{d_0^2 \Delta C_i}{p_{ij}(x, y)(k + d_0 \Delta C_i)} \tag{6}$$

Equation 7 is another formulation similar to Equation (6) but formulated to calculate a total capacitive response.

$$f = \frac{d_0^2 \Delta C_{total}}{\sum_{ij} (p_{ij}(x, y)(k + d_0 \Delta C_i))} \tag{7}$$

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A method of operating a capacitive sensing device having a plurality of sensor electrodes and at least one force electrode, the method comprising:
storing a baseline capacitance of the force electrode with no force applied to an input surface of the capacitive sensing device;
determining a first change in capacitance of the force electrode, relative to the baseline capacitance, caused by an input object contacting the input surface;
determining a mechanical change compensation factor associated with the capacitive sensing device by applying a pre-determined calibration force to the input surface and measuring a second change in capacitance of the force electrode in response to the pre-determined calibration force being applied to the input surface, wherein the mechanical change compensation factor comprises a ratio between the second change in capacitance to an arithmetic product of the pre-determined calibration force times an arithmetic sum of the baseline capacitance plus the second change in capacitance; and
determining force information for the force electrode based on at least the mechanical change compensation factor, and the first change in capacitance of the force electrode.

2. The method of claim 1, wherein the pre-determined calibration force is applied by a calibration device.

3. The method of claim 1, wherein the mechanical change compensation factor is a ratio comprising an inverse of the pre-determined calibration force.

4. The method of claim 2, wherein the calibration device is configured to apply the pre-determined calibration force to a specified location on the input surface.

5. The method of claim 1, further comprising determining force information for a second input object contacting the input surface based on a proportionality function that comprises at least the mechanical change compensation factor.

6. The method of claim 1, further comprising:
acquiring further second changes of capacitance of the plurality of sensor electrodes and updating a set of parameters of the mechanical change compensation factor based on the further second changes of capacitance.

7. The method of claim 1, wherein the baseline capacitance is determined according to a calibration process that applies either no force or a known force to the input surface of the capacitive sensing device.

8. A processing system for a capacitive sensing device having an input surface, wherein the capacitive sensing device comprises at least one force electrode and a plurality of sensor electrodes, the processing system comprising:
a sensor module including sensor circuitry configured to be coupled to the plurality of sensor electrodes and the at least one force electrode, wherein the sensor module is configured to:
store a baseline capacitance of the force electrode with no force applied to the input surface of the capacitive sensing device;
determine a first change in capacitance of the force electrode, relative to the baseline capacitance, caused by an input object contacting the input surface;
determine a mechanical change compensation factor associated with the capacitive sensing device by applying a pre-determined calibration force to the input surfaced and measuring a second change in capacitance of the force electrode in response to the pre-determined calibration force being applied to the input surface, wherein the mechanical change compensation factor comprises a ratio between the second change in capacitance to an arithmetic product of the pre-determined calibration force times an arithmetic sum of the baseline capacitance plus the second change in capacitance; and
determine force information for the force electrode based on at least the mechanical change compensation factor and the first change in capacitance of the force electrode.

9. The processing system of claim 8, wherein the pre-determined calibration force is applied by a calibration device.

10. The processing system of claim 8, wherein the capacitive sensing device comprises at least one display cell.

11. The processing system of claim 10, wherein the capacitive sensing device further comprises at least one compressible layer.

12. The processing system of claim 8, wherein the sensor module is configured to determine force information for a second input object contacting the input surface based on a proportionality function that comprises at least the mechanical change compensation factor.

13. The processing system of claim 8, wherein the sensor module is further configured to acquire further second changes of capacitance of the plurality of sensor electrodes and to update a set of parameters of the mechanical change compensation factor based on the further second changes of capacitance.

14. The processing system of claim 8, wherein the baseline capacitance is determined according to a calibration process that applies either no force or a known force to the input surface of the capacitive sensing device.

15. A capacitive sensing device having an input surface, the capacitive sensing device comprising:
at least one force electrode;
a plurality of sensor electrodes; and
a processing system coupled to the plurality of sensor electrodes and the at least one force electrode, the processing system comprising a sensor module having sensor circuitry, wherein the sensor module is configured to:
store a baseline capacitance of the force electrode with no force applied to the input surface of the capacitive sensing device;
determine a first change in capacitance of the force electrode, relative to the baseline capacitance, caused by an input object contacting the input surface;
determine a mechanical change compensation factor associated with the capacitive sensing device by applying a pre-determined calibration force to the input surface and measuring a second change in capacitance of the force electrode in response to the pre-determined calibration force being applied to the input surface, wherein the mechanical change compensation factor comprises a ratio between the second change in capacitance to an arithmetic product of the pre-determined calibration force times an arithmetic sum of the baseline capacitance plus the second change in capacitance; and determine force information for the force electrode based on at least the mechanical change compensation factor and the first change in capacitance of the force electrode.

16. The capacitive sensing device of claim 15, wherein the pre-determined calibration force is applied by a calibration device.

17. The capacitive sensing device of claim 15, wherein the capacitive sensing device comprises at least one display cell.

18. The capacitive sensing device of claim 15, wherein the capacitive sensing device further comprises at least one compressible layer.

19. The capacitive sensing device of claim 15, wherein the sensor module is further configured to acquire further second changes of capacitance of the plurality of sensor electrodes and to update a set of parameters of the mechanical change compensation factor based on the further second changes of capacitance.

20. The capacitive sensing device of claim 15, further comprising:

a backlight disposed between a thin-film transistor (TFT) substrate and the at least one force electrode.

* * * * *